Patented Dec. 18, 1951

2,579,296

UNITED STATES PATENT OFFICE 2,579,296

CHLORINATED PINENE INSECTICIDAL COMPOSITION

George Allen Buntin, Wilmington, Del., assignor to Hercules Powder Company, Wilmington, Del., a corporation of Delaware No Drawing. Application April 8, 1948, Serial No. 19,865

12 Claims. (Cl. 167—30)

This invention relates to insecticidal compositions and more particularly to insecticidal compositions containing a highly chlorinated pinene as the toxic ingredient.

Among the more commonly used insecticidal toxicants are the naturally occurring products, pyrethrum, rotenone, and nicotine. These natural products have the very great disadvantage of not being uniform in their insecticidal activity and thus make it difficult to formulate insecticidal compositions. Many synthetic products have been suggested in the past as substitutes for these toxicants; however, they are usually lacking in one respect or another. Either they do not have a high enough killing power and must be used in concentrations which cause irritation to the user, or, if they are sufficiently toxic, they are also toxic to forms of animal life other than insect pests.

Now in accordance with this invention it has been found that insecticidal compositions containing as the toxic ingredient of chlorinated pinene which has a chlorine content of from about 62% to about 72% possess an unusual degree of insecticidal activity. Because of the very high killing power of a chlorinated pinene containing 62% to 72% chlorine, extremely dilute solutions of these toxicants are effective.

The following examples will illustrate the preparation and insecticidal activity of insecticidal compositions containing these chlorinated pinenes.

Example 1

One part of commercial alpha-pinene (88% alpha-pinene) dissolved in 4 parts of carbon tetrachloride was placed in a chlorination vessel and exposed to ultraviolet illumination. Chlorine was passed into the agitated mixture at a a rate that allowed for maximum absorption of the chlorine. The temperature rose immediately, due to the heat of reaction, to 174° F. and gradually decreased as the chlorination proceeded. Samples were removed at intervals during the chlorination, a total of 7 samples being removed. The carbon tetrachloride was then removed from each of these samples by sparging with nitrogen at 100° C.

The 7 chlorinated pinenes, of different chlorine content, were tested for their insecticidal activity against houseflies. In this and the following examples the test for insecticidal activity against houseflies was made in the following manner and is referred to in this specification as the bell jar method.

Approximately 100 five-day old flies (*Musca domestica*) were placed in a bell jar and a predetermined quantity of the insecticide to be tested was atomized into the bell jar. The quantity of insecticide used was equal to the amount of the Official Test Insecticide which was necessary to give a 30 to 55% kill and must be within the limits of 0.25 to 0.35 cc. After spraying the insecticide into the chamber the flies were placed in an observation cage containing a wad of cotton wet with a concentrated sugar solution. At the end of 24 hours the number of dead and moribund flies were counted. All tests were carried out at 80°–90° F. and 50–70% relative humidity.

The results of the analysis for chlorine content and of tests made on 0.5% solutions in deodorized kerosene of the above 7 chlorinated pinenes are given in the following table. The data are an average of a series of tests made on each solution.

| Chlorination Time in Hrs. | Per Cent Chlorine | Per Cent Dead in 24 Hrs. | O. T. I. Difference |
|---|---|---|---|
| 8 | 60.3 | 33 | −19 |
| 9.5 | 62.9 | 56 | +7 |
| 11 | 65.0 | 75 | +26 |
| 18 | 67.2 | 96 | +47 |
| 24 | 70.8 | 77 | +28 |
| 31 | 72.0 | 51 | +2 |
| 46 | 73.3 | 25 | −27 |

Example 2

One part of beta-pinene was dissolved in 5 parts of carbon tetrachloride. Chlorine was passed into the agitated solution which was exposed to ultraviolet illumination, the chlorination being carried out at a temperature of about 70°–75° C. Samples were removed at intervals during the chlorination, a total of 5 samples being removed. The carbon tetrachloride was removed from each of these samples by sparging with nitrogen at a pressure of 30 mm.

The 5 chlorinated pinenes were tested for their insecticidal activity against houseflies by the bell jar method. The results of the analysis for chlorine content and of tests made on 0.5% solutions of these chlorinated pinenes in deodorized kerosene are given in the following table. The data are an average of a series of tests made on each solution.

| Chlorination Time in Hrs. | Per Cent Chlorine | Per Cent Dead in 24 Hrs. | O. T. I. Difference |
|---|---|---|---|
| 2.75 | 58.4 | 16 | −17 |
| 3.75 | 62.0 | 35 | +2 |
| 4.75 | 64.3 | 68 | +35 |
| 6.50 | 66.9 | 98 | +65 |
| 13 | 71.8 | 57 | +24 |

Example 3

An insecticidal dust containing a chlorinated pinene as a toxicant was prepared by dissolving the chlorinated pinene (containing 67.7% chlorine, prepared by chlorinating a commercial alpha-pinene) in kerosene and spraying this solution onto fuller's earth in such proportions as to give a mixture containing 40% of the chlorinated pinene. This material was then ground and mixed in a 1:1 ratio with pyrophyllite to prepare a final dust containing 20% of the chlorinated pinene. This dust was tested for its insecticidal activity against cotton insects and was found to be very effective, giving a 100% kill against the flea hopper, about 50% kill against both the boll worm and boll weevil and 88% kill against the leaf worm.

The chlorinated pinene which is used as the toxic ingredient of the insecticidal compositions in accordance with this invention should contain an amount of chlorine of from about 62% to about 72% and preferably from about 66% to about 70%. As may be seen from the foregoing examples, a chlorinated pinene having a chlorine content within these ranges has a very high insecticidal activity, a kill of approximately 100% being obtained within the more preferable range.

The chlorinated pinene containing from about 62% to about 72% chlorine may be obtained by chlorinating a pinene, specifically either alpha- or beta-pinene, or mixtures thereof, or any commercial material containing essentially alpha- and beta-pinenes, such as gum or wood turpentine or sulfate turpentine. The chlorination of the pinene may be carried out in the presence or absence of a solvent. Lower temperatures are maintained during the chlorination, if a solvent is used. Suitable solvents for the chlorination are chloroform, carbon tetrachloride, pentachloroethane, etc. Chlorination catalysts may be used if desired, ultraviolet light being particularly efficient.

The insecticidal compositions of this invention may be made up of the chlorinated pinene admixed with any suitable type of diluent. If a liquid spray is desired the chlorinated pinene may be dissolved in any convenient solvent, such as deodorized kerosene, or it may be dispersed in water to form an aqueous spray. Insecticidal dusts may be prepared by placing the chlorinated pinene on a diluent or carrier such as powdered carbon, kieselguhr, bentonite, pyrophyllite, etc.

For many purposes it may be desirable to use the chlorinated pinene in combination with other insecticidal toxicants. Many toxicants have a very high knockdown in relatively dilute solutions, but much higher concentrations must be used in order to obtain the desired degree of kill. Due to the very high degree of killing power which a chlorinated pinene containing from about 62% to about 72% chlorine possesses, it may be added to such toxicants, thereby enabling the use of a much more dilute solution than would otherwise be possible in the finished insecticide. Toxicants with which the chlorinated pinene may be combined include such compounds as rotenone, pyrethrum, and organic thiocyanates such as alkyl thiocyanates, thiocyano ethers such as beta-butoxy-beta'-thiocyanoethyl ether, and terpene thiocyanoacylates such as isobornyl thiocyanoacetate, fenchyl thiocyanoacetate, and isobornyl alpha-thiocyanopropionate.

As may be seen from the foregoing examples, a chlorinated pinene containing from about 62% to about 72% chlorine has a very high insecticidal activity. The amount of the chlorinated pinene to be admixed with the diluent depends upon the use to which the insecticidal composition will be put. For example, for use as a household spray, the chlorinated pinene is very effective at a concentration of 0.5% in deodorized kerosene, but when used as an agricultural dust a concentration of 10% to 20% or more may be desirable. The insecticidal compositions of this invention are useful in combatting flies, mosquitoes, roaches, moths, carpet beetles, bed bugs, and many other pests.

This application is a continuation-in-part of my application for United States Letters Patent Serial Number 609,027, filed August 4, 1945, now abandoned.

What I claim and desire to protect by Letters Patent is:

1. An insecticidal composition comprising the product obtained by chlorination of a pinene with chlorine gas at an elevated temperature, below the temperature at which the product decomposes, to a chlorine content of from about 62% to about 72% chlorine and an insecticidal adjuvant as a carrier therefor.

2. An insecticidal composition comprising the product obtained by chlorination of α-pinene with chlorine gas at an elevated temperature, below the temperature at which the product decomposes, to a chlorine content of from about 62% to about 72% chlorine and an insecticidal adjuvant as a carrier therefor.

3. An insecticidal composition comprising the product obtained by chlorination of β-pinene with chlorine gas at an elevated temperature, below the temperature at which the product decomposes, to a chlorine content of from about 62% to about 72% chlorine and an insecticidal adjuvant as a carrier therefor.

4. An insecticidal composition comprising the product obtained by chlorination of a pinene with chlorine gas at an elevated temperature, below the temperature at which the product decomposes, to a chlorine content of from about 66% to about 70% chlorine and an insecticidal adjuvant as a carrier therefor.

5. An insecticidal composition comprising the product obtained by chlorination of α-pinene with chlorine gas at an elevated temperature, below the temperature at which the product decomposes, to a chlorine content of from about 66% to about 70% chlorine and an insecticidal adjuvant as a carrier therefor.

6. An insecticidal composition comprising the product obtained by chlorination of β-pinene with chlorine gas at an elevated temperature, below the temperature at which the product decomposes, to a chlorine content of from about 66% to about 70% chlorine and an insecticidal adjuvant as a carrier therefor.

7. An insecticidal composition comprising the product obtained by chlorination of a pinene with chlorine gas at an elevated temperature, below the temperature at which the product decomposes, to a chlorine content of from about 62% to about 72% chlorine and a hydrocarbon solvent insecticidal adjuvant as a carrier therefor.

8. An insecticidal composition comprising the product obtained by chlorination of a pinene with chlorine gas at an elevated temperature, below the temperature at which the product decomposes, to a chlorine content of from about 62% to about 72% chlorine and a solid insecticidal adjuvant as a carrier therefor.

9. An insecticidal composition comprising an aqueous insecticidal dispersion of the product obtained by the chlorination of a pinene with chlorine gas at an elevated temperature, below the temperature at which the product decomposes, to a chlorine content of from about 62% to about 72% chlorine.

10. An insecticidal composition comprising the product obtained by chlorination of a pinene with chlorine gas at an elevated temperature, below the temperature at which the product decomposes, to a chlorine content of from about 66% to about 70% chlorine and a hydrocarbon solvent insecticidal adjuvant as a carrier therefor.

11. An insecticidal composition comprising the product obtained by chlorination of a pinene with chlorine gas at an elevated temperature, below the temperature at which the product decomposes, to a chlorine content of from about 66% to about 70% chlorine and a solid insecticidal adjuvant as a carrier therefor.

12. An insecticidal composition comprising an aqueous insecticidal dispersion of the product obtained by the chlorination of a pinene with chlorine gas at an elevated temperature, below the temperature at which the product decomposes, to a chlorine content of from about 66% to about 70% chlorine.

GEORGE ALLEN BUNTIN.

REFERENCES CITED

The following references are of record in the file of this patent:

UNITED STATES PATENTS

| Number | Name | Date |
| --- | --- | --- |
| 1,366,106 | Weeks | Jan. 18, 1921 |
| 2,337,043 | Hasselstrom et al. | Dec. 21, 1943 |

OTHER REFERENCES

Simonsen: "The Terpenes," vol. II, pp. 142–143, 281 (1932).

Desalbres et al.: Chimie & Industrie, vol. 58, pp. 443–8 (1947), thru Chem. Abstracts, vol. 42, p. 2719 f.

Cupples et al.: J. Econ. Ent., vol. 29, No. 3, pp. 611–618 (1936). (See particularly p. 615.)

Frankforter: J. Am. Chem. Soc., vol. 28, pp. 1461–1465 (1906).

Certificate of Correction

Patent No. 2,579,296                                                        December 18, 1951

GEORGE ALLEN BUNTIN

It is hereby certified that error appears in the printed specification of the above numbered patent requiring correction as follows:

Column 1, line 22, for "of chlorinated" read *a chlorinated*; line 39, after "at" strike out "a";

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*